(12) United States Patent
Bernadat et al.

(10) Patent No.: US 8,590,304 B2
(45) Date of Patent: Nov. 26, 2013

(54) BRAKING CIRCUIT MASTER CYLINDER LIP SEAL

(75) Inventors: Olivier Bernadat, Le Perreux (FR); François Gaffe, Bondy (FR); Laurent Lhuillier, Le Blanc Mesnil (FR); Antony Auguste, Villier sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 875 days.

(21) Appl. No.: 12/638,379

(22) Filed: Dec. 15, 2009

(65) Prior Publication Data

US 2010/0154407 A1 Jun. 24, 2010

(30) Foreign Application Priority Data

Dec. 19, 2008 (FR) .................................. 08 07183

(51) Int. Cl.
*B60T 11/236* (2006.01)
*B60T 11/16* (2006.01)

(52) U.S. Cl.
USPC .............................................. 60/588; 60/586

(58) Field of Classification Search
USPC ...................................................... 60/586, 588
See application file for complete search history.

(56) References Cited

U.S. PATENT DOCUMENTS

| | | | |
|---|---|---|---|
| 4,326,379 A | 4/1982 | Dauvergne | |
| 4,781,024 A | 11/1988 | Nakamura | |
| 6,272,858 B1 | 8/2001 | Takano et al. | |
| 7,104,059 B2 * | 9/2006 | Tsubouchi et al. | 60/588 |
| 7,343,741 B2 | 3/2008 | Bernadat et al. | |
| 7,401,468 B2 | 7/2008 | Mouri et al. | |
| 7,520,132 B2 * | 4/2009 | Chiba | 60/588 |
| 7,934,378 B2 | 5/2011 | Gaffe et al. | |
| 7,937,940 B2 | 5/2011 | Gaffe et al. | |
| 7,966,813 B2 * | 6/2011 | Struschka | 60/588 |
| 8,276,994 B2 | 10/2012 | Lee et al. | |
| 2005/0115237 A1 | 6/2005 | Tsubouchi et al. | |
| 2006/0219507 A1 | 10/2006 | Drott et al. | |
| 2007/0283691 A1 | 12/2007 | Tetsuka et al. | |
| 2008/0053305 A1 | 3/2008 | Struschka | |
| 2010/0066028 A1 | 3/2010 | Aoki et al. | |
| 2010/0154407 A1 | 6/2010 | Bernadat et al. | |
| 2010/0212313 A1 | 8/2010 | Aoki et al. | |
| 2011/0209472 A1 | 9/2011 | Aoki et al. | |

FOREIGN PATENT DOCUMENTS

| | | |
|---|---|---|
| DE | 102006040487 B3 * | 11/2007 |
| EP | 778190 | 6/1997 |

(Continued)

OTHER PUBLICATIONS

FR0807183 Search Report and Written Opinion.

(Continued)

*Primary Examiner* — Thomas E Lazo
(74) *Attorney, Agent, or Firm* — Michael Best & Friedrich LLP

(57) ABSTRACT

Master cylinder of a hydraulic braking circuit, particularly for a motor vehicle, comprising a piston (2) sliding axially in a body (4) comprising an annular lip seal (51) produced by molding, and comprising an internal, dynamic sealing lip (14) surrounding the piston and connected by a curved surface (36) to a planar rear face (30) comprising radial passages which are defined by blocks formed as projections on the rear face of the seal, these blocks being separated from the curved surface (36).

15 Claims, 2 Drawing Sheets

(56) References Cited

FOREIGN PATENT DOCUMENTS

| | | |
|---|---|---|
| EP | 1616768 | 1/2006 |
| JP | 2004231093 | 8/2004 |
| JP | 200762570 | 3/2007 |
| WO | 2008054010 | 5/2008 |
| WO | WO 2008054010 A1 * | 5/2008 |

OTHER PUBLICATIONS

Office Action from the United States Patent and Trademark Office for U.S. Appl. No. 12/640,821 dated Oct. 5, 2012 (10 pages).
Final Rejection from the United States Patent and Trademark Office for U.S. Appl. No. 12/640,821 dated Mar. 28, 2013 (12 pages).
FR Patent Office Search Report and Written Opinion for Application No. 0807186 dated Nov. 3, 2009 (6 pages).

* cited by examiner

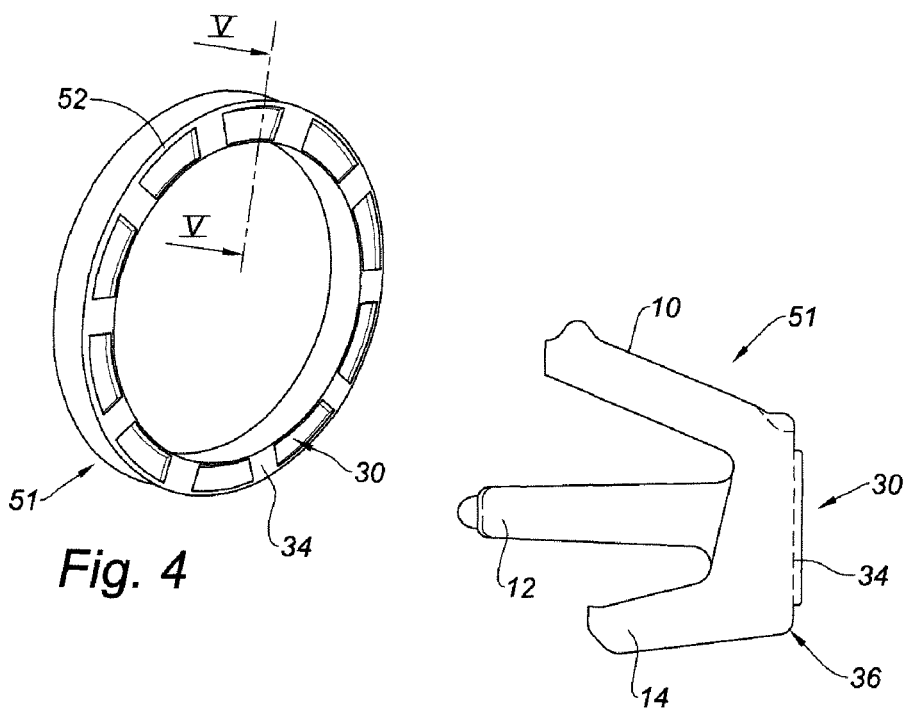
Fig. 4
Fig. 5
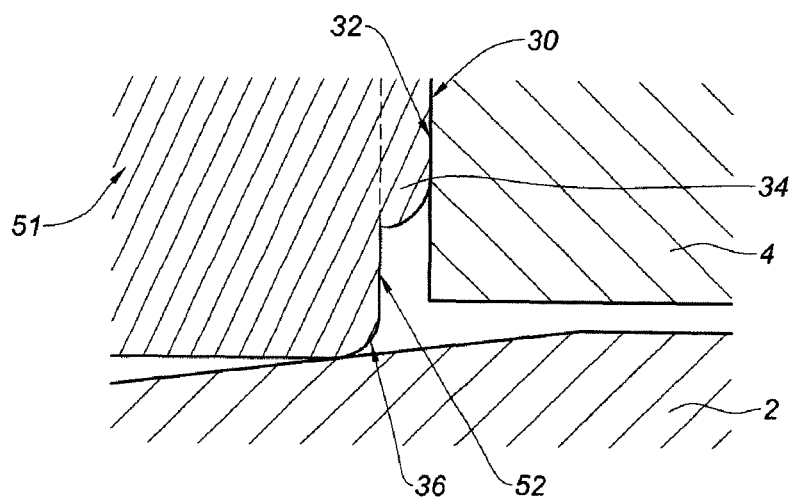
Fig. 6

BRAKING CIRCUIT MASTER CYLINDER LIP SEAL

BACKGROUND OF THE INVENTION

The present invention relates to a master cylinder of a braking circuit, particularly for a motor vehicle.

Motor vehicles comprise a brake control generally comprising a brake pedal acting on a master cylinder, to transmit, via a hydraulic circuit, a fluid pressure to receivers that brake the various wheels.

The master cylinder comprises a piston sliding axially in a body comprising a lip seal which presses against the piston, in order to separate a rear volume containing a reserve of liquid at atmospheric pressure from a front volume comprising a chamber pressurized by the displacement of this piston.

A master cylinder of this type, described in document U.S. Pat. No. 6,272,858 B1, is equipped with a circular seal with two lips. The internal lip of the seal surrounds the piston providing dynamic sealing and, when the piston is at rest in a rear position, enters a piston groove which has a shallow depth and gently inclined side walls.

In this piston rest position, a radial drilling formed in the piston opens into the groove behind the internal lip of the seal, to place the pressure chamber in communication with the reserve of liquid and, if necessary, readjust the volume of the hydraulic circuit.

The lip seal is wedged axially in an annular housing of the body around the piston and comprises an external lip which presses against an external cylindrical wall of this housing, to provide static sealing between the pressure chamber and the rear volume.

The seal additionally comprises a planar rear face which presses against a planar transverse rear face of the annular housing, to wedge the seal axially in the housing.

Motor vehicles may comprise driving aid systems which brake some of the wheels of the vehicle, for example to stabilize the course followed by the vehicle, in the case of ESP systems.

In such cases, the system may quickly call for substantial amounts of liquid in the brake circuit, which liquid is drawn through the master cylinder to be supplied to the wheel brakes, from the reserve of brake fluid. The fluid has then quickly to pass via the lips of the annular seal, which lift because of the depression pulled downstream.

In an known arrangement, the rear face of the annular seal comprises radial grooves which extend over the entire height of the seal, so as to allow liquid to pass radially outwards, between the annular seal and the planar rear face of the housing of the body.

When there is a demand for fluid in the brake circuit, the liquid follows a path along the radial grooves to reach the external lip, and feeds into the braking circuit via this path.

In the case of an annular seal that has been produced by molding, one known method of manufacturing the mold is to use EDM machining to machine that surface of the mold that corresponds to the rear face of the annular seal, comprising the bearing surfaces and the grooves, using a one-piece electrode.

A chief disadvantage with this method, given the spread on manufacturing dimensions, is that it is possible that the electrode may not be positioned precisely relative to those parts of the mold that have been produced beforehand by turning, and this may give rise to leaks in the annular seal at the lines where the surfaces created by turning meet those created by EDM, when such lines are on a dynamic sealing surface.

SUMMARY OF THE INVENTION

It a particular object of the present invention to avoid these disadvantages of the prior art and to bring to the creation of a master cylinder lip seal a solution that is simple and effective and guarantees good sealing.

To this end, the present invention proposes a master cylinder of a hydraulic braking circuit, particularly for a motor vehicle, comprising a piston sliding axially in a body comprising an annular lip seal separating a rear volume containing a reserve of liquid from a front volume comprising a pressurizing chamber, this seal comprising an internal, dynamic sealing, lip surrounding the piston and connected by a curved surface to a planar rear face comprising radial passages and pressing against a transverse rear surface of the seal housing, characterized in that the radial passages are defined by blocks formed as projections on the rear face of the seal, these blocks being separated from the curved surface for connection to the internal lip.

One essential advantage of the annular seal according to the invention is that the EDM electrode used to form, in the mold, cavities that correspond to the aforementioned blocks of the rear face of the seal, can be slightly off-centered with respect to the dynamic sealing surfaces, without any detrimental effect on these surfaces.

According to another feature of the invention, the annular seal comprises on its rear face a planar transverse surface forming a continuous annular ring situated radially between the blocks and the curved surface, these blocks projecting axially rearward with respect to this planar annular ring.

Advantageously, the annular ring is radially aligned with the bottom of the grooves.

The invention also proposes an annular lip seal for a master cylinder of the type described hereinabove, this seal comprising an internal, dynamic sealing, lip connected by a curved surface to a planar rear face comprising radial passages, characterized in that the radial passages are defined by blocks formed as projections on the rear face of the seal, these blocks being separated from the curved surface for connection to the internal lip of the seal.

BRIEF DESCRIPTION OF THE DRAWINGS

The invention will be better understood and other features and advantages will become more clearly apparent from studying the following description given by way of example, and by referring to the attached drawings in which:

FIG. 4 is a perspective view of an annular seal according to the invention;

FIG. 5 is an axial half section of this annular seal on the plane V-V;

FIG. 6 is an enlarged axial half section of part of this annular seal pressing against the piston of a master cylinder.

DETAILED DESCRIPTION

Figure 1:
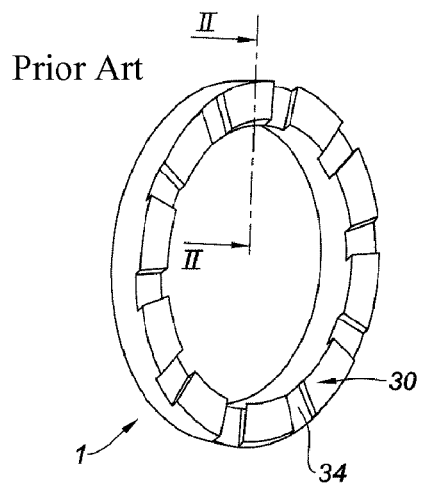
FIG. 1 is a perspective view of an annular seal according to the prior art.
Figure 2:
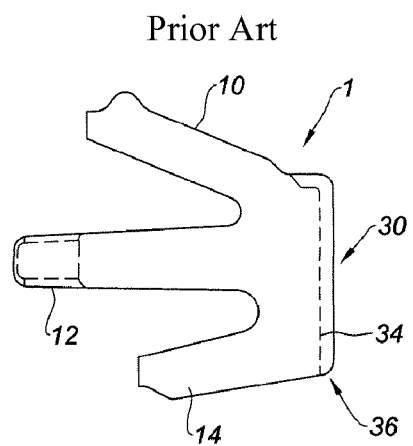
FIG. 2 is an axial half section of this annular seal on the plane II-II.
Figure 3:
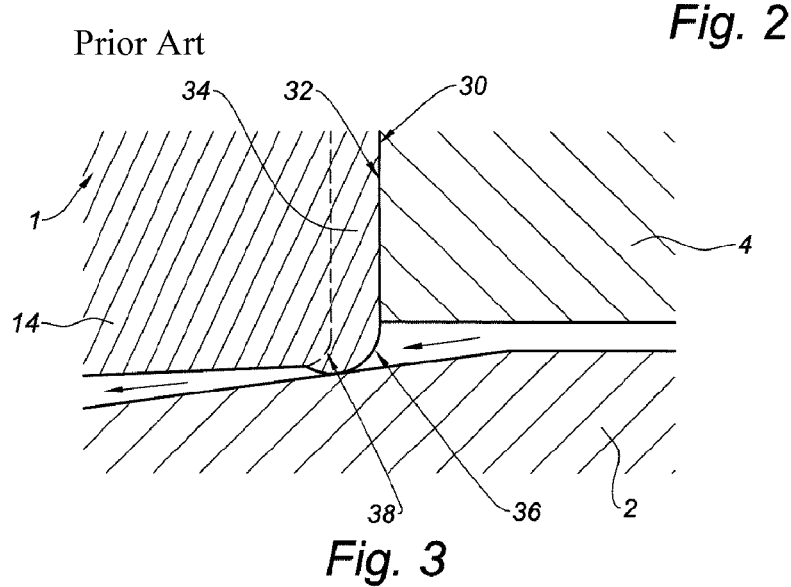
FIG. 3 is an enlarged axial half section of part of this annular seal pressing against the piston of a master cylinder.

FIGS. 1 to 3 depict a known annular seal 1 surrounding a piston 2 sliding axially in a body 4 of a brake master cylinder.

The annular seal 1 positioned in an annular housing of the body 4, comprises an external lip 10 the end of which presses radially against an exterior cylindrical wall of this housing, to provide static sealing, and an internal lip 14 the end of which presses radially against the exterior surface of the piston 2 to provide dynamic sealing as this piston slides.

The annular seal 1 may also comprise an axial lip 12 which is radially intermediate between the external 10 and internal 14 lips, and the end of which presses against a substantially radial front face of the annular housing in order to wedge this seal axially between the two, front and rear, faces of the housing.

The annular seal 1 comprises an annular and substantially planar rear face 30 which presses against a planar transverse surface 32 situated axially to the rear of the housing.

The rear face 30 comprises a series of radial grooves 34 distributed at even angular spacings and extending over the entire height of the seal, forming as many radial passages allowing liquid to flow radially outwards between the rear face 30 of the annular seal 1 and the transverse rear surface 32 of the housing accommodating this seal.

The radial rear face 30 of the seal is connected to the lower surface of the internal lip 14 by a convex curved surface 36.

The mold corresponding to this seal is manufactured first of all using turning operations to finish all the circular surfaces, then using an EDM operation using an electrode, to form the surfaces corresponding to the rear face 30 of the annular seal 1.

One risk, illustrated in FIG. 3, is that given the manufacturing tolerances, the positioning of the electrode will not be perfectly concentric with the surfaces created by turning, and that this may locally cause the surface 36 to be offset radially toward the axis, with respect to the turned surfaces such as the internal lip 14.

If this happens, the point 38 of connection between the radial grooves 34 and the internal lip 14 may fail to come into contact with the piston 2, thus risking leakage when the braking circuit is pressurized.

FIGS. 4 to 6 depict a seal 51 according to the invention, which comprises an external lip 10, an internal lip 14 and an axial lip 12 like the known seal of FIGS. 1 to 3.

The rear face 30 of the annular seal 51 comprises a planar annular first surface comprising the bottoms of evenly distributed radial grooves 34, and a transverse continuous ring 52 situated radially toward the center of this rear face and which is connected to the lip 14 by a convex curved surface 36.

The rear face additionally comprises blocks separated from the curved surface 36, which projects axially rearward to delimit the grooves 34 between them.

The mold corresponding to this seal is manufactured as follows. First of all, turning is used to produce the various circular parts, notably the internal lip 14, the planar face comprising the transverse ring 52 and the bottom of the radial grooves 34, and the connecting surface 36 that joins them together.

Next, an EDM operation using an electrode is used to cut from the mold the cavities that will form the rear bearing blocks of the annular seal 51.

In this way, by separating the blocks from the connecting surface 36, and even with imperfect concentricity of the electrode used to cut the cavities in the mold, there is no risk of creating interference with the surface 36 and of forming a discontinuity at this surface. The continuity of the connecting surface 36 and of its pressing against the sliding piston 2 is assured, ensuring a good dynamic seal against this piston.

In addition, the mold is easier to manufacture and can be produced more simply with wider tolerances, which is more economical.

The invention claimed is:

1. A master cylinder of a hydraulic braking circuit, the master cylinder comprising:
   a body (4) having a rear surface (32);
   a piston (2) axially slidable in the body (4);
   an annular lip seal (51) engaged with the piston (2) the lip seal (51) comprising:
      an internal, dynamic sealing lip (14) surrounding the piston (2);
      a rear face (30) comprising an annular, radially inner ring (52), a plurality of radially extending grooves (34), and a plurality of raised blocks located radially outwardly of the inner ring (52), the radially extending grooves (34) extending between the raised blocks; and
      a curved surface (36) connecting the sealing lip (14) to the inner ring (52);
      wherein the plurality of raised blocks are configured to press against the rear surface (32) of the body (4);
      wherein the inner ring (52) and the grooves (34) form a continuous, planar surface along the rear face (30), the continuous, planar surface being recessed from the raised blocks.

2. The master cylinder of claim 1, wherein the annular lip seal (51) further comprises an external lip 10 connected to the rear face (30).

3. The master cylinder of claim 2, wherein the annular lip seal (51) further comprises an axial lip (12) located radially intermediate between the external lip (10) and internal sealing lip (14).

4. The master cylinder of claim 1, wherein the raised blocks have planar rear surfaces.

5. The master cylinder of claim 1, wherein the raised blocks have a generally trapezoidal shape.

6. An annular lip seal (51) comprising:
   an internal, dynamic sealing lip (14);
   a rear face (30) comprising an annular, radially inner ring (52), a plurality of raised blocks on the rear face (30) and located radially outwardly of the inner ring (52), and a plurality of grooves (34) extending between the raised blocks; and
   a curved surface (36) connecting the sealing lip (14) to the inner ring (52);
   wherein the inner ring (52) and the grooves (34) forming a continuous, planar surface along the rear face (30), the continuous, planar surface being recessed from the blocks.

7. The annular lip seal (51) of claim 6, further comprising an external lip (10) connected to the rear face (30).

8. The annular lip seal (51) of claim 7, wherein the annular lip seal (51) further comprises an axial lip (12) located radially intermediate between the external lip (10) and internal sealing lip (14).

9. The annular lip seal (51) of claim 6, wherein the raised blocks have planar rear surfaces.

10. The annular lip seal (51) of claim 6, wherein the raised blocks have a generally trapezoidal shape.

11. A master cylinder of a hydraulic braking circuit for a motor vehicle, the master cylinder comprising:
   a body (4) having a rear surface (32);
   a piston (2) axially slidable in the body (4);
   an annular lip seal (51) engaged with the piston (2) the lip seal (51) comprising:

an internal, dynamic sealing lip (14) surrounding the piston (2);

a rear face (30) comprising an annular, radially inner ring (52), a plurality of radially extending grooves (34), and a plurality of raised blocks, the plurality of raised blocks located radially outwardly of the inner ring (52), the radially extending grooves (34) extending between the raised blocks;

a curved surface (36) connecting the sealing lip (14) to the inner ring (52);

wherein the plurality of raised blocks are configured to press against the rear surface (32) of the body (4);

wherein the inner ring (52) and the grooves (34) form a continuous, planar surface along the rear face (30), the continuous, planar surface being recessed from the raised blocks.

12. The master cylinder of claim 11, wherein the annular lip seal (51) further comprises an external lip 10 connected to the rear face (30).

13. The master cylinder of claim 12, wherein the annular lip seal (51) further comprises an axial lip (12) located radially intermediate between the external lip (10) and internal sealing lip (14).

14. The master cylinder of claim 11, wherein the raised blocks have planar rear surfaces.

15. The master cylinder of claim 11, wherein the raised blocks have a generally trapezoidal shape.

\* \* \* \* \*